（12） United States Patent
Karas et al.

(10) Patent No.: US 8,972,840 B2
(45) Date of Patent: *Mar. 3, 2015

(54) TIME ORDERED INDEXING OF AN INFORMATION STREAM

(75) Inventors: D. Matthew Karas, London (GB); William J. Muldrew, London (GB)

(73) Assignee: Longsand Limited (GB)

( * ) Notice: Subject to any disclaimer, the term of this patent is extended or adjusted under 35 U.S.C. 154(b) by 2425 days.

This patent is subject to a terminal disclaimer.

(21) Appl. No.: 11/734,409

(22) Filed: Apr. 12, 2007

(65) Prior Publication Data

US 2007/0198259 A1     Aug. 23, 2007

Related U.S. Application Data

(62) Division of application No. 10/060,495, filed on Jan. 29, 2002, now Pat. No. 7,206,303.

(30) Foreign Application Priority Data

Nov. 3, 2001   (GB) .................................. 0126439.9

(51) Int. Cl.
G06F 17/28        (2006.01)
H04N 21/435       (2011.01)
G10L 15/05        (2013.01)
G06F 17/30        (2006.01)
G10L 15/26        (2006.01)
(Continued)

(52) U.S. Cl.
CPC .............. *H04N 21/435* (2013.01); *G10L 15/05* (2013.01); *G06F 17/30855* (2013.01); *G10L 15/265* (2013.01); *H04H 60/37* (2013.01); *H04H 60/56* (2013.01); *H04N 21/235* (2013.01); *H04N 21/2353* (2013.01); *H04N 21/84* (2013.01); *H04N 21/8586* (2013.01)
USPC ........................................... 715/203; 704/253

(58) Field of Classification Search
CPC ................................. G10L 15/04; G10L 15/05
USPC ....................... 704/211, 253; 715/208; 725/51
See application file for complete search history.

(56) References Cited

U.S. PATENT DOCUMENTS 5,136,655 A * 8/1992 Bronson ........................ 704/270
5,729,741 A * 3/1998 Liaguno et al. ............... 704/270
(Continued)

FOREIGN PATENT DOCUMENTS

EP     0 749 109 A2     12/1996
EP     0 810 794 A2     12/1997
(Continued)

OTHER PUBLICATIONS

Fast-Talk™ "Accurate High-Speed Audio Searching-Wtithout Text Conversion", Copyright 2001, 1 page, http://www.fast-talk.com/, Oct. 2001.

(Continued)

*Primary Examiner* — Cesar Paula
*Assistant Examiner* — Tyler J Schallhorn

(57) ABSTRACT

Methods and apparatuses in which two or more types of attributes from an information stream are identified. Each of the identified attributes from the information stream is encoded. A time ordered indication is assigned with each of the identified attributes. Each of the identified attributes shares a common time reference measurement. A time ordered index of the identified attributes is generated.

13 Claims, 4 Drawing Sheets

(51) Int. Cl.
*H04H 60/37* (2008.01)
*H04H 60/56* (2008.01)
*H04N 21/235* (2011.01)
*H04N 21/84* (2011.01)
*H04N 21/858* (2011.01)

(56) References Cited

U.S. PATENT DOCUMENTS

| | | | |
|---|---|---|---|
| 5,774,593 A | 6/1998 | Zick et al. | |
| 5,802,361 A | 9/1998 | Wang et al. | |
| 5,903,892 A * | 5/1999 | Hoffert et al. | 715/716 |
| 6,073,095 A | 6/2000 | Dharanipragada et al. | |
| 6,249,765 B1 * | 6/2001 | Adler et al. | 704/500 |
| 6,336,093 B2 | 1/2002 | Fasciano | |
| 6,442,518 B1 * | 8/2002 | Van Thong et al. | 704/235 |
| 6,442,519 B1 | 8/2002 | Kanevsky et al. | |
| 6,463,444 B1 * | 10/2002 | Jain et al. | 715/723 |
| 6,490,580 B1 * | 12/2002 | Dey et al. | 715/203 |
| 6,505,153 B1 | 1/2003 | Van Thong et al. | |
| 6,665,644 B1 | 12/2003 | Kanevsky et al. | |
| 6,877,134 B1 * | 4/2005 | Fuller et al. | 715/202 |
| 6,990,448 B2 | 1/2006 | Charlesworth et al. | |
| 7,206,303 B2 | 4/2007 | Karas et al. | |
| 7,272,594 B1 | 9/2007 | Lynch et al. | |
| 7,512,900 B2 | 3/2009 | Lynch et al. | |
| 2002/0135618 A1 | 9/2002 | Maes et al. | |
| 2002/0163533 A1 | 11/2002 | Trovato et al. | |
| 2002/0178002 A1 * | 11/2002 | Boguraev et al. | 704/235 |
| 2002/0193991 A1 | 12/2002 | Bennett et al. | |
| 2004/0080528 A1 | 4/2004 | Rand et al. | |

FOREIGN PATENT DOCUMENTS

| | | |
|---|---|---|
| EP | 0 982 684 A1 | 3/1998 |
| EP | 0 982 947 A2 | 3/2000 |
| EP | 1 076 329 A2 | 2/2001 |
| GB | 1 255 834 | 12/1971 |
| GB | 2 351 592 A | 1/2001 |
| GB | 2 381 638 | 5/2003 |
| GB | 2 381 688 | 5/2003 |
| GB | 2 388 739 | 11/2003 |
| GB | 2 388 738 | 6/2004 |
| WO | WO 98/47084 | 10/1998 |
| WO | WO 00/46787 | 8/2000 |
| WO | WO 01/65420 A2 | 9/2001 |
| WO | WO 01/95631 A2 | 12/2001 |
| WO | WO 01/95631 A3 | 12/2001 |

OTHER PUBLICATIONS

Fast-Talk™ "Technology", Copyright 2001, 3 pages, http://www.fast-talk.com/technology.html, Oct. 2001.

Fast-Talk™ "Technology, Other Methods of Searching Audio Content", Copyright 2001, 2 pages, http://www.fast-talk.com/technology_other.html, Sep. 2001.

Dremedia, "Cutting to the Heart of Digital TV,Core Video Technology", Copyright 2001, 3 pages, http://www.dremedia.com/technology/corevideo.php, Sep. 2001.

Mark Clements, Sc.D., Peter S. Cardillo, MSEE, Michael Miller, CTO, "Phonetic Searching of Digital Audio", 10 pages, published 2001, Fast-Talk Communications, Inc., Atlanta, Georgia.

Mark Clements, Sc.D., Peter S. Cardillo, MSEE, Michael Miller, CTO, "Phonetic Searching vs. LVCSR: How to Find What You Really Want in Audio Archives", 17 pages, published 2001, Fast-Talk Communications, Inc., Atlanta Georgia.

Dremedia, "Cutting to the Heart of Digital TV,Core Audio Technology", Copyright 2001, 3 pages, http://www.dremedia.com/technology/audio.html.

Dremedia, "Cutting to the Heart of Digital TV, Dremedia—Technology Cutting to the Heart of Digital TV", Copyright 2001, 3 pages, http://www.dremedia.com/technology.

Dremedia, "Cutting to the Heart of Digital TV, Dremedia's XML Architecture", Copyright 2001, 2 pages, http://www.dremedia.com/technology/xml.html.

Dremedia, "Cutting to the Heart of Digital TV, Core Video Technology", Copyright 2001, 2 pages, http://www.dremedia.com/technology/corevideo.html.

Dremedia, Cutting to the Heart of Digital TV, Core Text Technology, Copyright 2001, 3 pages, http://www.dremedia.com/technology/icoretext.html.

Dremedia, "Cutting to the Heart of Digital TV, Dremedia iTVNow™ Fully Automated Interactive Television Production and Delivery", Copyright 2001, 5 pages, http://www.dremedia.com/products/itvnow.html.

Dremedia, Cutting to the Heart of Digital TV, Dremedia TM Production Suite™ Fully Automated Digital Media Production and Management, Copyright 2001, 6 pages, http://www.dremedia.com/products/tape.html.

Virage, "Media Analysis Plug-Ins for VideoLogger", Virage Brochure, Copyright 2001, 2 pages.

Virage, "Media Analysis Software, Introducing Real-Time Analysis Software for Face and On-Screen Text Recognition", Copyright 2001, 2 pages, http://www.virage.com/products/media_analysis_software.html.

Virage, "VideoLogger", Copyright 2001, 2 pages, http://www.virage.com/products/videologger.html.

Virage, "SmartEncode, The Virage SmartEncode™ Process", Copyright 2001, 2 pages, http://www.virage.com/products/smartencode.html.

Wactlar, H., Kanade, T., Smith, M. Stevens, S., "Intelligent Access to Digital Video: The Informedia Project", IEEE Computer, 29(5), Digital Library Initiative Special Issue, May 1996, pp. 19 total.

Seigler, M.A., PhDs Thesis, "Integration of Continuous Speech Recognition and Information Retrieval for Mutually Optimal Performance", Carnegie Mellon University, Electrical and Computer Engineering, Dec. 15, 1999, pp. 82 total.

Hauptmann, A., "Integrating and Using Large Databases of Text, Images, Video and Audio", IEEE Intelligent Systems Magazine, 14(5), Sep./Oct. 1999, pp. 34-35.

Bruce Lucas, VoiceXML for Web-Based Distributed Conversational Applications, 2000, Communications of the ACM, vol. 43, No. 9, pp. 53-57.

Search Report from UK Patent Office, for application No. GB 0216439.9, Date of Search May 20, 2002, pp. 1 total.

Search Report from UK Patent Office, for application No. GB 0318846.3, Date of Search Sep. 9, 2003, pp. 3 total.

* cited by examiner

TIME ORDERED INDEXING OF AN INFORMATION STREAM

RELATED APPLICATIONS

This is a Divisional of application Ser. No. 10/060,495, filed on Jan. 29, 2002, now U.S. Pat. No. 7,206,303 which claims the benefit of UK patent application No. 0126439.9, titled Time Ordered Indexing Of An Information Stream, filed Nov. 3, 2001.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

This invention generally relates to operating upon one or more streams of information. More particularly an aspect this invention relates to capturing attributes in audio-visual data and encoding these attributes to share a common time reference.

BACKGROUND OF THE INVENTION

Volumes of material come into television, radio, and news production facilities today. In any of these production facilities, finding a desired piece of information from an information source such as a news broadcast typically includes a broad range of manual functions. For example, some of the tasks associated with a television production include locating specific footage, researching archives, identifying relevant segments from live feeds, logging, formatting for multiple interactive standards and delivering to multiple devices. In a previous used technology, personnel manually generated software tags for the content with descriptors about the audio/video data in order to search through and find a desired piece of information in the volumes of material. Journalists, interns or researchers viewed hours of tape manually searching and analyzing through the recorded information to find the exact segment or piece of knowledge that the person was seeking. The same burdensome task typically applies to most unstructured pieces of information including radio broadcasts, newspaper articles, World Wide Web sources etc.

Audio-visual data may come from a variety of sources such as satellite broadcasts, Web broadcasts, Television broadcasts, etc. The audio-visual information from these sources is typically too costly to reuse because the audio and video signals are out of synchronization. Even though both sources of information originally came from the same source, once separated few ways exist to synchronize the signals except repeated attempts to manually synchronize both sources of information. Even if the audio and video data have been encoded, the index for the audio stream and the index for the video data must be manually correlated to attempt to synchronize both sets of data. Manual synchronizing the audio and video data is typically time consuming and expensive. Further, even without the signals being separated, repeated attempts are typically made to manually queue up the start and end video frame from a video clip. The queing up task may be laborious.

Ideally, today's Interactive TV may rapidly respond to a user queries as well as provide extra value added services, such as automatically provide links to relevant material to supplement the subject matter being broadcast on the interactive TV. Currently, costly manual production and preparation must be performed to allow Interactive TV to provide such amenities.

SUMMARY OF THE INVENTION

Methods and apparatuses in which two or more types of attributes from an information stream are identified. Each of the identified attributes from the information stream is encoded. A time ordered indication is assigned with each of the identified attributes. Each of the identified attributes shares a common time reference. A time ordered index of the identified attributes is generated.

BRIEF DESCRIPTION OF THE DRAWINGS

The drawings refer to the invention in which.

Figure 1:
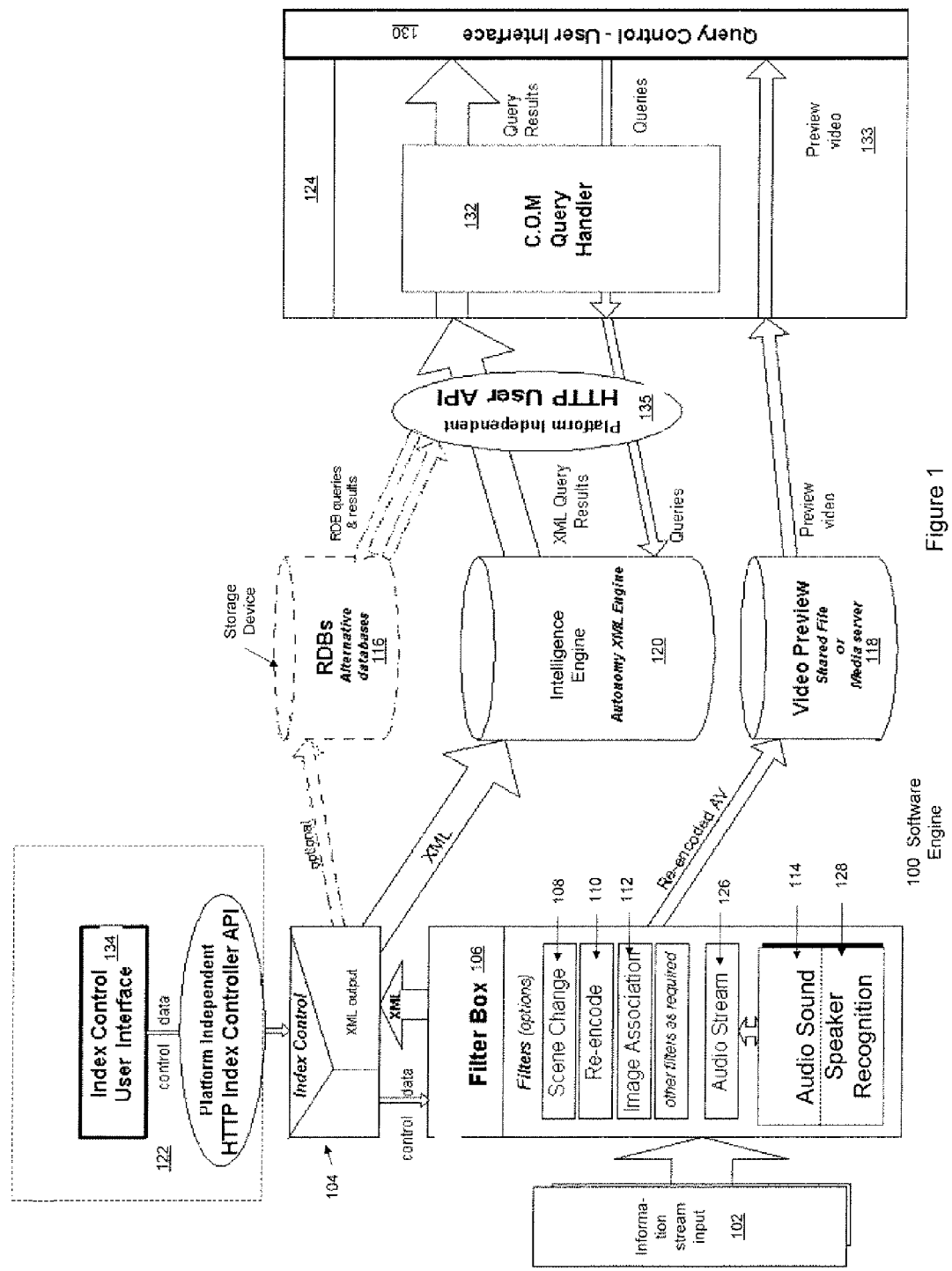
FIG. 1 illustrates an embodiment of a software engine that identifies one or more attributes of an information stream such as audio-visual data, captures each identified attribute of the information stream, assigns a time ordered indication with each of the identified attributes, and generates a time ordered index of the identified attributes.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific attributes, named components, connections, computer languages and human languages, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

In general, various methods and apparatuses are described that may use image, voice, and text analysis software to identify and index attributes of an information stream, such as streaming video. Once the attributes from the information stream are identified, then the software engine may automate functions such as locating a specific segment of footage by the words that were spoken in that footage, research archives for similar information even while the original feed is still be recorded, identify the most relevant segment from a live feed, as well as multiple other uses that can be done once aspects of the information stream are broken down into attributes and then indexed.

FIG. 1 illustrates an embodiment of a software engine that identifies one or more attributes of an information stream such as audio-visual data, captures each identified attribute of the information stream, assigns a time ordered indication with each of the identified attributes, and generates a time ordered index of the identified attributes. In an embodiment, the software engine 100 may include one or more inputs 102 for information streams, an index control module 104, a filter box 106 containing one or more attribute filters 108, 110, 112, 114, storage devices such as a rational data base 116 and a video media server 118, an intelligence engine 120, a triggering and synchronization module 122 including an index control user interface 134, and a manipulation module 124 including a query control user interface 130.

Overall, in an embodiment, one or more streams of information pass through one or more filter boxes 106. The filter boxes 106 send data corresponding to attributes of the information stream passing through that filter box 106 to the index control module 104. The index control module 104 indexes all of the data from the one or more filter boxes 106. The index control module 104 then may send the indexed data to a storage device 116 as well as the intelligence engine 120. The manipulation module 124 contains a graphic user interface to allow a user to manipulate the indexed data. The triggering and synchronization module 122 allows the user to program events to occur automatically based upon the indexed data passing through the index control module 104.

In an embodiment, the software engine 100 may have one or more information stream inputs 102 into a filter box 106. In an embodiment, at least one of the information stream inputs 102 includes audio-visual data. In an embodiment, each information stream that contains audio-visual data may be separated into discrete information streams such as a video information stream input and an audio information stream input. In an embodiment, each audio information stream may be separated into different channels of audio information. In an embodiment, information streams are not separated into different component parts prior to entering a filter box 106. Each information stream may be supplied to the attribute filters 108, 110, 112, 114 within a filter box 106 in parallel or sequentially in series.

The filter box 106 contains various attribute filters 108, 110, 112, 114. For example, an embodiment may contain attribute filters including a scene change attribute filter 108, a re-encode attribute filter 110, an image association attribute filter 112, and an audio sound attribute filter 114. In an embodiment, the one or more attribute filters 108, 110, 112, 114 may identify attributes from each stream of information. The identified attributes may be a scene change, a fade, a pan, a human language type, a human accent, speaker's individual voice characteristic, discrete spoken words, individual written words, image characteristics and other similar characteristics. In an embodiment, each attribute filter 108, 110, 112, 114 may be separated into discrete modules to increase the focus, efficiency, and resolution capability of that individual module. In an embodiment, each attribute filter 108, 110, 112, 114 detects for specific attributes from the information stream input data such as scene changes, speaker changes, each word spoken by a speaker, etc. Each attribute filter 108, 110, 112, 114 then identifies that detected attribute. Once the attribute is identified by a given attribute filter 108, 110, 112, 114, then the identified attribute is encoded into a computer language.

Figure 2:
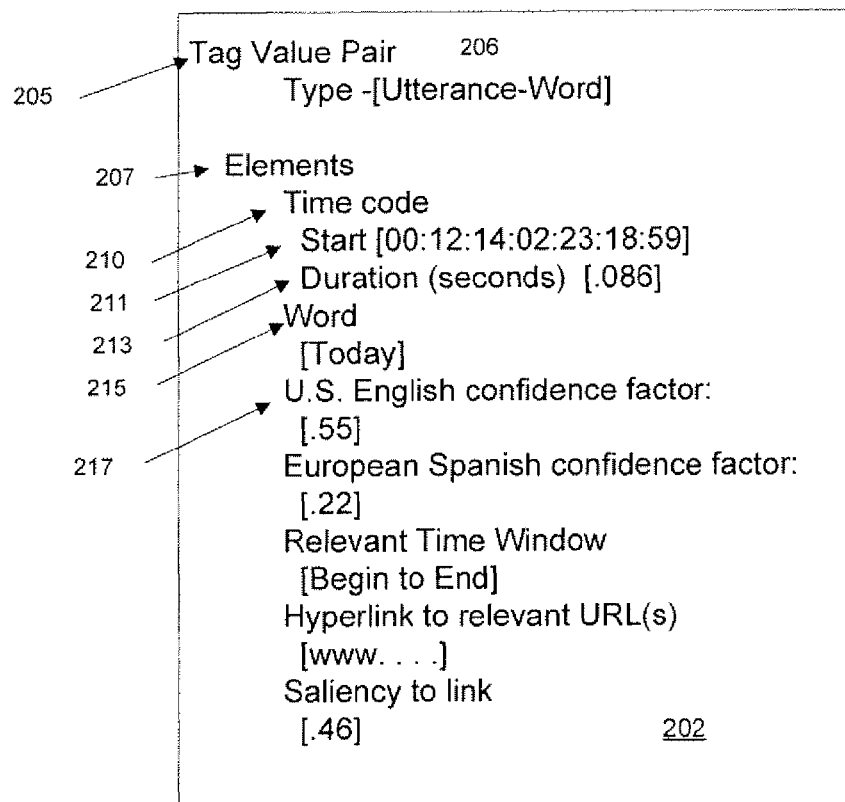
FIG. 2 illustrates exemplary identified attributes encoded into a computer language.
Figure 2:
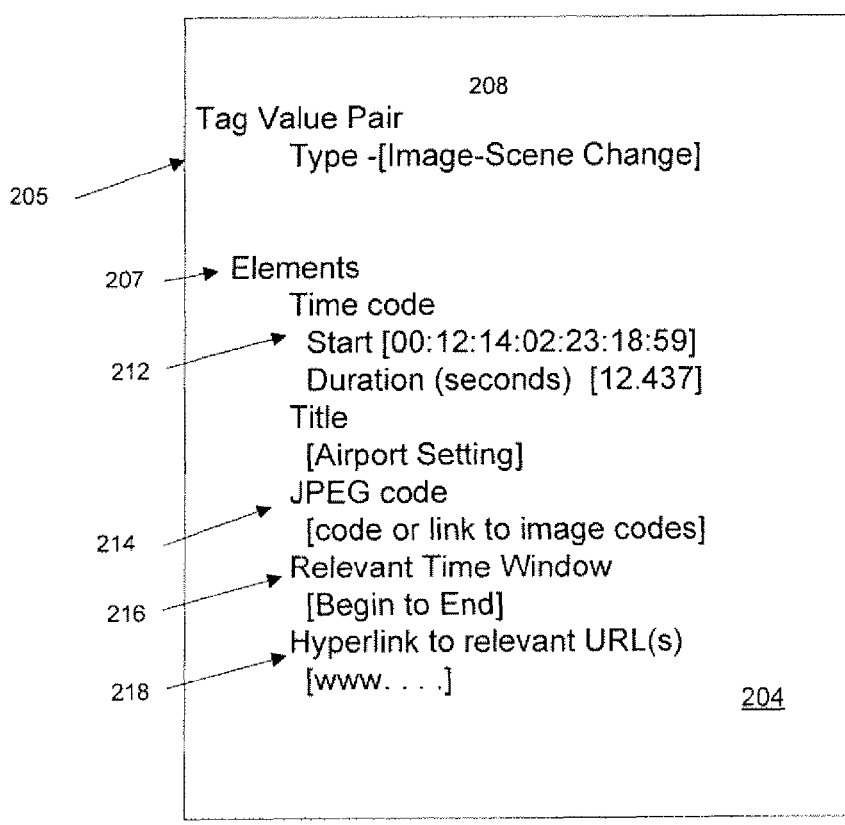

FIG. 2 illustrates exemplary identified attributes encoded into a computer language. In an embodiment, each attribute filter may use an embedded tag structure computer language such as external markup language (XML) to encode the identified attribute data. In an embodiment, the attribute filter may utilize another embedded tag structure computer language such as hypertext markup language (not shown) but for ease of understanding the concepts of the invention XML will be described.

Two exemplary XML documents 202, 204 produced by attribute filters will be described. An XML document has a hierarchical layered structure including tag-value pairs and elements of that tag value pair. In an embodiment, an XML tag value pair 205 defines the particular type of attribute, such as a scene change 208, a word 206, a speaker change, a human language being spoken, etc. and elements 207 of the particular tag value pair 205 define characteristics of that attribute, such as a time code 210, etc. For example, a first tag-value pair 206 may contain the identified attribute of "Utterance-Word" which indicates the attribute filter detected an Utterance and identified the utterance as a word. Similarly, a second tag-value pair 208 may contain the identified attribute of "Image-Scene Change" which indicates that the attribute filter detected an Image and identified a scene change corresponding to that image.

As noted, the elements 207 may describe characteristics, such as meta data, associated with a particular tag-value 205. For, example, the Utterance-Word tag value pair 206 may include elements such as the time code 210 including the start time 211 and duration 213 of the identified attribute, what the individual identified word 215 is such as "Today" one or more confidence ratings as to the accuracy of the identified word 217, as well as any other information associated with that identified attribute. Similarly, the Image-Scene Change tag value pair 208 may include elements 207 such as the time code 212, Joint Photographic Experts Group (JPEG) code 214, the relevant time window from the beginning of the scene change to the end of the scene change 216, hyperlinks to relevant URL's 218, as well as any other information associated with that identified attribute.

Referring to FIG. 1, in an embodiment, the information stream is processed by the one or more attribute filters 108, 110, 112, 114 in each filter box in order to produce an XML document containing a rich variety of audio meta data, visual meta data, or both. The attribute filters 108, 110, 112, 114 may be programmed to extract the content and meta-data from each segment of the monitored information stream 102. In an embodiment, the attribute filters 108, 110, 112, 114 due to the nature of tag-structured languages inherently attach the XML tags based on the nature of the content extracted from information streams 102. The XML tags enable material to be identified and distributed and the software engine 100 to automatically capture, categorize, link or make material available via the appropriate system.

Each individual attribute filter 108, 110, 112, 114 may generate its own XML document containing the identified attribute. Further, each individual XML document may be summed into an overall XML document containing a conglomeration of all the individual XML documents pertaining to the entirety of the identified attribute. For example, the overall XML document may capture a transcript of the spoken language; speaker segmentation and/or identification; human language identification; human accent and dialect identification; shot change information; Image association signatures; any other auxiliary data available from legacy systems or source meta-data.

For example, after a shot change in the information stream occurs an attribute filter, such as shot change attribute filter, detects the shot change and sends the encoded data to the index control module 106. The index control module 106 may create a thumbnail image for the conglomerated individual XML documents containing the video images from the beginning of the shot change to the end of the shot change. The entire video clip from shot change to shot change would be an overall XML document containing a conglomeration of all the individual XML documents pertaining to the entirety of the identified attribute.

In an embodiment, the index control module 104 generates the time codes which each attribute filter 108, 110, 112, 114 attaches as an element for each identified attribute. Therefore, every identified attribute of an information stream may be referenced to the same time keeping mechanism, such as a clock or video frame counter. In an embodiment, the index control module 104 generates time codes for each identified attribute referenced to the time indication or the video frame count. In an embodiment, the index control module 104 uses a time ordered index via a data table that keeps track of the data by a time indication and may be correlated by the time indication. In an embodiment, an integrated time ordered index consists of some or all of the attributes identified by the attributes filters from the same information stream merged into single index of identified attributes all sharing a common time reference.

In an embodiment, a first attribute from the information stream may be correlated or paired attributes with other attributes having a similar time code. The similar time code may be a first attribute possessing the same start time code as a second attribute or due to the duration of the attributes overlapping with each other. For example, separate identified attributes the same information stream such as a video clip of a person speaking and the transcribed text of the person's speech, may be frame accurate because they both referenced to the same synchronized time code. Thus, the sequence of time coded XML documents containing a video track from pan to fade or scene change to scene change may be synchronized with an audio track corresponding to the audio XML documents having the same sequence of time codes.

In an embodiment, the index control module 104 is an HTTP controlled server that coordinates information stream processing jobs. The index control module 104 distributes the processing load over a number of slave filter boxes 106. The index control module 104 monitors for processing requests and directs the processing requests on to the filter boxes 106. The index control module 104 manages the XML results that each filter box 106 streams back to the index control module 104. Any data coming from the filter box 106 can be sent by the index control module 104 to the intelligence engine 120 as unstructured data. The index control module 104 also processes the control commands that enable the management of processing jobs and inquiries into job statuses.

In an embodiment, the index control module 104 is controlled using HTTP commands processing requests. The HTTP commands can be issued via a HTTP proxy server in order to cross network boundaries even with a firewall in place. Once a processing job is complete, then the index control module 104 may perform one or both of the following two actions. The index control module 104 may index the attribute results into the intelligence engine 120. The index control module 104 may also save the results into a local directory where it can be accessed by external processes. Once the identified attribute is captured, then the information may be sent as an XML document to a database such as a rational database 116.

The filter box 106 may be a slave process to the index control module 104. Multiple filter boxes 106 can be installed on different physical machines. The index control module 104 may be configured to distribute processing requests to each of the filter boxes 106. The capability of having multiple processing machines can ensure real-time or better processing rates even when the processing load is very high.

The processing tasks performed by an individual filter box 106 are determined by the plug-in attribute filters 108, 110, 112, 114 that are configured to be used in that individual filter box. This modular architecture allows attribute filters to be added or removed as desired.

Each attribute filter 108, 110, 112, 114 may perform a different processing task on the information stream. Alternatively, a first attribute filter, such as an accent identification attribute filter, may accept as its input the output of second attribute filter, such as speech recognition attribute filter 128. In an embodiment, the output of each attribute filter 108, 109 110, 112, 114 may be merged into an integrated time ordered index because each identified attribute shares a common time reference measurement.

Various attribute filters may be included and a few exemplary modules will be described. In an embodiment, the video attribute filters use signal processing techniques that segment the content of a digital image into its component parts, in order that they may be identified, understood, labeled and indexed. In an embodiment, the core video attribute filters are based around condensation tracking and temporal fusion. The video stream is broken down into frames that are analyzed and compared in order to identify objects within a complex image, to identify changes of shot, and in order to reconcile unsynchronized soundtracks. Thus, resynchronizing the video attribute data with other attribute data is made simple. For example, combining image analysis of speaking lips with speech recognition and frame accurate signal manipulation allows resynchronization to be achieved at the press of a button. In an embodiment, every spoken word is logged against a time frame measurement shared by the corresponding video data. This generates an index of the information stream.

The Scene Change attribute filter 108 analyses the video stream and detects scene changes and shot changes. The Scene Change attribute filter 108 can distinguish between fades, pans and cuts, and upon detecting one, outputs a thumbnail picture, the current time code, and other characteristics of that attribute. The time index thumbnail is sent to the index control module 104. The index control module 104 may send the XML documents to the media server 118. The manipulation module 124 contains a Graphic User Interface that can access this information, display these thumbnails, and permit the user to navigate through the audio-visual clips e.g. by clicking on the thumbnail.

The Image Association attribute filter 112 analyses the output of the Scene Change Filter 108 and extracts the thumbnail image from its results. The Image Association attribute filter 112 may apply multiple algorithms to the thumbnail image to produce a characteristic image signature. The index control module 104 can take these image signatures and index them into the storage devices 116 and/or the intelligence engine 120. The intelligence engine 120 can later be queried for images containing similar image signatures.

In an embodiment, the video attribute filters use signal processing techniques that segment the content of a digital image into its component parts, in order that they may be identified, understood, labeled and indexed. In an embodiment, the core video attribute filters are based around condensation tracking and temporal fusion. The video stream is broken down into frames that are analyzed and compared in order to identify objects within a complex image, to identify changes of shot, and in order to reconcile unsynchronized soundtracks. Thus, resynchronizing the video attribute data with other attribute data is made simple. For example, combining image analysis of speaking lips with speech recognition and frame accurate signal manipulation allows resynchronization to be achieved at the press of a button. In an embodiment, every spoken word is logged against a time frame measurement shared by the corresponding video data. This generates an index of the information stream.

In an embodiment, extracting individual shots from unlogged video archives can be achieved at many times real time, allowing instant access to key features within archives. In an embodiment, when working in RAID and extended storage provider environments, the software engine leverages disk optimization and caching features to optimize performance. In an embodiment, the software engine may process the information within the information stream at real time.

The audio sound attribute filter 114 monitors the audio information stream to detect and identify spoken words, common sounds, human language identification; human accent and dialect identification, and other similar audio sounds. In an embodiment, the audio sound attribute filter 114 may be a SoftSound process. In an embodiment, the audio sound attribute filter 114 employs a speech recognition module 128. The audio sound attribute filter 114 may also provide Transcription and Speaker Segmentation/Identification of spoken audio information. Before sending the audio data encoded in XML, the audio sound attribute filter 114 may perform any bit-rate conversion and re-sampling that may be required.

In an embodiment, the audio sound attribute filter 114 transcribes spoken audio using whatever human language it is configured to use. The audio information can also be streamed to multiple transcription processes running different human language models, which enables automatic human language selection without human intervention. In an embodiment, the audio sound attribute filter 114 uses multiple human language models such as United States English, United Kingdom English, European Spanish, Columbian Spanish, German, Russian, and Mandarin Chinese. Multiple transcription processes configured to run in different languages can be run in parallel. The index control module 104 compares the results of each language model to determine which human language is being spoken.

In an embodiment, a human language accent and dialect attribute filter may be added into the audio sound attribute filter 114. Alternatively, the output data from a human language accent attribute filter may be the input into or combined with the audio sound attribute filter data. In an embodiment, the audio sound attribute filter 114 ensures the correct language model is used, and audio-visual information streams containing multiple languages, e.g. interleaved United States and United Kingdom dialects, is transcribed with the highest possible accuracy due to each word transcribed from each language model containing a confidence rating in the accuracy of the transcribed word. In an embodiment, the audio sound attribute filter 114 also extends the language model vocabulary as new words enter the common vocabulary, e.g. names of new politicians etc.

In an embodiment, the Speaker Segmentation/Identification attribute filter 128 analyses the audio stream 126 and attempts to identify the speaker against its database of known people. Even if this proves to be unsuccessful i.e. if the speaker is unknown, the time offsets at which the speaker changes are detected and identified. The speaker change attributes can be useful for navigation through the indexed data similar to the indexed thumbnails. In an embodiment, the manipulation-module 124 contains a GUT that enables the management of the speaker database, the entry of new speakers, as well other similar activities. In an embodiment, the manipulation-module 124 allows a user to jump immediately to indexed data corresponding to a specific speaker by simply clicking on that speaker icon.

In an embodiment, the audio attribute filters use statistical methods to process the digital audio signal. The audio attribute filters may be based upon decomposing digitized speech into its phonetic constructs. The phonetic sequence is then analyzed in conjunction with acoustic model and statistical improbabilities to calculate which is the most probable sequence of words and utterances. The audio attribute filters employ recognition technologies that keyword spotting to small and large vocabulary continuous speech recognition and information retrieval from spoken documents—to enable applications in speech and audio processing, such as: speech recognition, speaker recognition, language recognition and speech enhancement. In an embodiment, the audio attribute filters use neural network technology and "Hidden Markov Models" (HMMs) to construct an acoustic model that is able to provide a fast, accurate and dynamic solution within variable and rapidly changing acoustic environments. The audio attribute filters recognize human speech and log every spoken word against a time code frame. This generates an index enabling rapid access to the precise frame where each word is spoken.

In an embodiment, the audio attribute filters may use predictive technology to provide the benefits of a large vocabulary speech recognition system without the overhead of a vast search space when considering sample audio.

The audio attribute filters may have inter-speaker independence. Recognition of speakers requires no initial training on the part of audio sound attribute filter 114 based upon the attribute filters being able to detect and identity unique characteristics of a speaker. The audio attribute filters may identify the unique characteristics such as vocabulary accent, and human language to individual speakers.

In an embodiment, the monitoring of a multiple real-time audio broadcasts is possible using one or more audio sound attribute filters 114 to process incoming audio feeds in excess of twice real-time. In an embodiment, the software engine accesses a Redundant Array of Independent Disks (RAID) environment as well as an extended storage provider environments, to leverage disk optimization and caching features to ensure the optimal performance.

In an embodiment, communication between the audio attribute filters, video attribute filters and other components within a larger networked system through use of HTTP over TCP/IP allows for a highly scalable distributed system.

In an embodiment, each filter box may contain attribute filters other than video and audio attribute filters such as a text attribute filter that detects and identifies text within an information stream.

The storage devices 116 may include a rational data base and an image server to store the data associated with the information streams including the XML documents, associated image signatures, the JPEGs as well as other data.

The intelligence engine 120 may perform information operations. The intelligence engine 120 may provide both storage and search facilities on the XML results including the associated image signatures.

The intelligence engine 120 may process large amounts of structured and unstructured text, including the textual output from audio sound attribute filters 114 such as speech recognition 128. In an embodiment, based on advanced pattern-matching technology that exploits high-performance Bayesian probabilistic techniques, the intelligence engine 120 forms a conceptual understanding of text in any format and automates key operations and processing tasks upon it. In an embodiment, the intelligence engine 120 is an Autonomy Dynamic Reasoning Engine available from Autonomy Corporation, Cambridge Business Park, Cowley Rd, Cambridge United Kingdom.

In an embodiment, the intelligence engine 120 is based on advanced pattern-matching technology that exploits high-performance probabilistic modeling techniques to accept a piece of content and decide which operation to automatically perform on that information. A piece of content refers to a sentence, paragraph or page of text, meta-data, record containing human readable information, or the derived contextual information of an audio or speech snippet. In an embodiment, the automated information operations may be concept matching, agent creation, agent retraining, agent matching, information categorization, information summarization, and other similar information operations.

In an embodiment, the manipulation-module 124 includes a query control user interface 130, a query handler 132, one or more display windows 133 and a User Application Program Interface 135. The manipulation-module 124 interacts with the storage devices and the intelligence engine to allow a user to navigate and utilize the indexed information stream data.

Figure 3:
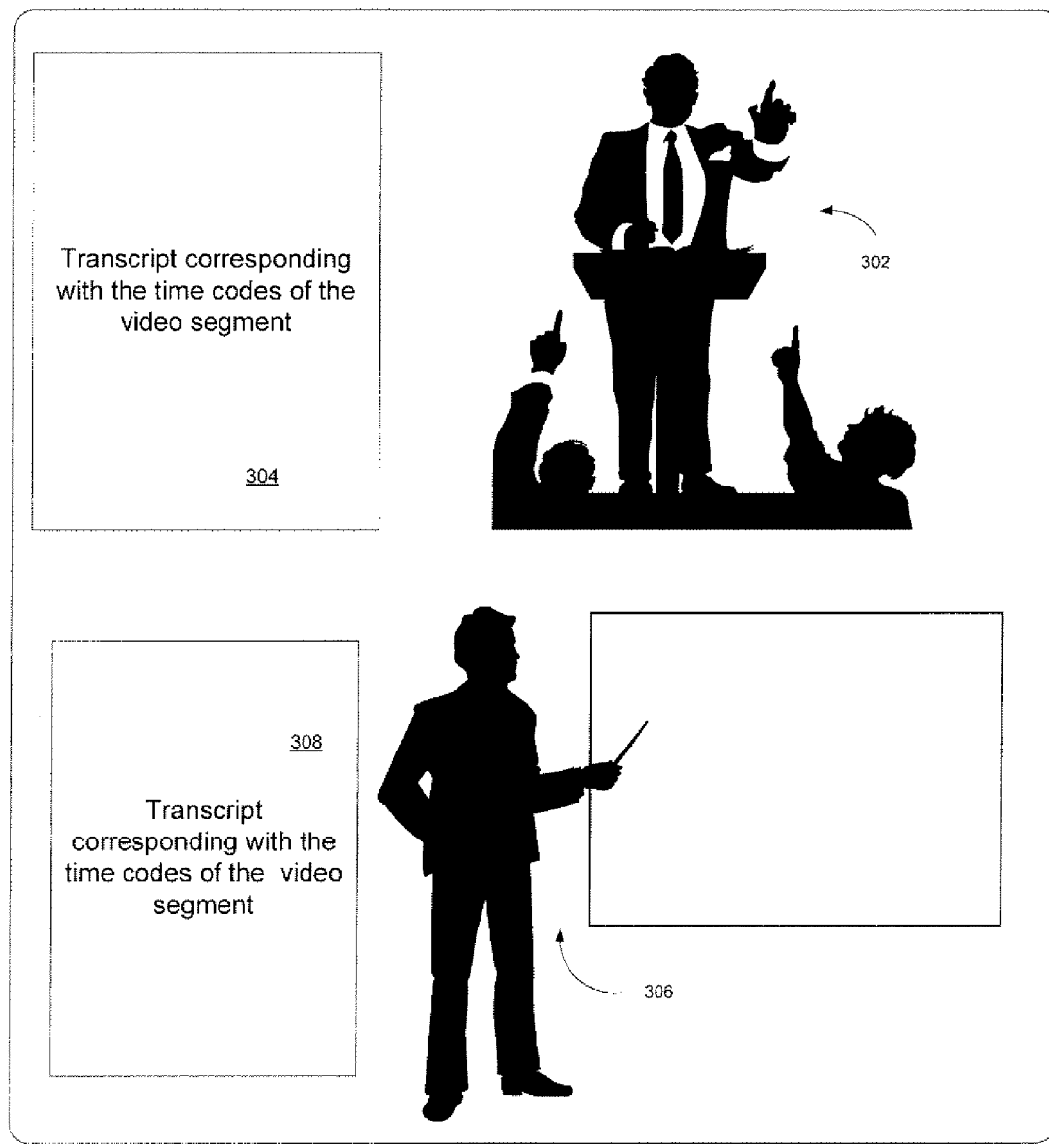
FIG. 3 illustrates an embodiment of the graphic user interface of the manipulation-module displaying exemplary indexed video segments and indexed transcripts corresponding to the video segments.

FIG. 3 illustrates an embodiment of the graphic user interface of the manipulation-module displaying exemplary indexed video segments and indexed transcripts corresponding to the video segments. The graphic user interface 300 displays a first aggregate XML document of video segment 302 in which a person is giving a speech. The graphic user interface 300 also displays a first aggregate XML document of a transcript 304 corresponding to that person's speech. Each aggregate XML document 302, 306 may consist of the individual XML document produced by the attribute filters in the filter box. The transcript corresponds with the time codes of the video segments 308. However, because each word is discreet XML document itself within the aggregate XML document, then a user may select a phrase or portion within the transcript and start playing the video segment from that exact frame location corresponding to the selected phrase. Thus, desired information within unstructured information may be accessed rapidly and with exactness.

Referring to FIG. 1, in which the manipulation-module 124 interacts with the storage devices 116 and the intelligence engine 120 to allow a user to navigate and utilize the indexed information stream data. Due to the identified attributes begin organized through a time ordered index, transmodal manipulations of each type of attribute may occur. A user through the user interface may perform operations on a first set of attributes in order to manipulate a second set of attributes. For example, a user may create a new video clip of a desired segment of video by highlighting the transcript text and cutting the transcript text from the text document. Further, the user may splice multiple video clips together by assembling and inserting text corresponding to each video clip. Thus, the user manipulates a first type of attribute such as the transcripted text in order to perform an operation on the second type of attribute.

In natural language and Boolean language queries, the intelligence engine 120 queries a natural language and/or Boolean language query from the manipulation-module 124 against any part of the XML documents stored in the storage, within the intelligence engine 120, and/or storage devices 116 external to the system such as the Internet. The intelligence engine 120 also can be queried to provide suggestions of similar content. Thus, for example, a user may remember three key words about a video segment of information that the user is trying to locate. The user may submit the query through the query control user interface 130 and view the resulting video segments that match the query results on in the display window 133.

In concept matching, the intelligence engine 120 accepts a piece of content or reference (identifier) as an input and returns references to conceptually related items ranked by relevance, or contextual distance. This may be used to generate automatic hyperlinks between pieces of content. Thus, while a live feed is being broadcast, the triggering and synchronization module 122 may display hyperlinks to related documents to the topic which the speaker is talking about based upon concept matching to the indexed transcript correlating to the video segment.

In agent creation, the intelligence engine 120 accepts a piece of content and returns an encoded representation of the concepts, including each concept's specific underlying patterns of terms and associated probabilistic ratings. In agent retraining, the intelligence engine 120 accepts an agent and a piece of content and adapts the agent using the content. In agent matching, the intelligence engine 120 accepts an agent and returns similar agents ranked by conceptual similarity. This may be used to discover users with similar interests, or find experts in a field. This may also be used to identify a particular speaker even though the software engine 100 has no previous knowledge of that speaker.

In agent alerting, the intelligence engine 120 accepts a piece of content and returns similar agents ranked by conceptual similarity. This may be used to discover users who are interested in the content, or find experts in a field.

In information categorization, the intelligence engine 120 accepts a piece of content and returns categories ranked by conceptual similarity. This may be used to discover which categories the content is most appropriate for, allowing subsequent tagging, routing or filing.

In information summarization, the intelligence engine 120 accepts a piece of content and returns a summary of the information containing the most salient concepts of the content. In addition, summaries can be generated that relate to the context of the original inquiry—allowing the most applicable dynamic summary to be provided in the results of a given inquiry.

In clustering, the intelligence engine 120, can organize large volumes of content or large numbers of profiles into self-consistent clusters. Clustering is an automatic agglomerative technique that partitions a corpus by grouping together information containing similar concepts.

In active matching, the intelligence engine 120 can accept textual information describing the current user task and returns a list of documents ordered by contextual relevance to the active task.

In retrieval, the intelligence engine 120 accepts natural language queries and returns a list of documents containing the concepts looked for, ordered by contextual relevance to the query. The intelligence engine 120 may also support Boolean queries.

The triggering and synchronization module 122 to automatically trigger links and synchronizes the appearance of the links in real time. The index control user interface 134 may issue processing jobs requests and monitor their progress. At the highest level there is the Indexing GUI, which is suited to once off processing requests, since it requires the manual entry of various processing parameters. At a lower level there may be scriptable command line utilities that enable the more technical user to run batch-processing jobs. At a lower level still, there may be the HTTP APIs, C APIs, C++ APIs and COM APIs that enable the applications programmer to control the processing back-end directly and programmatically.

As noted above, the triggering and synchronization module 122 may query the intelligence layer in order to approximately concurrently generate a link to related information from live source data. Live broadcast typically have a five second delay between being recorded to being broadcast. Further, the triggering and synchronization module 122 may establish a trigger for the intelligence engine 120 to send a link synchronized to appear at approximately upon the utterance of the most relevant word related to the link. Thus, the user may program through the triggering and synchronization module 122 to analyze the transcript of what is being said sentence by sentence, paragraph by paragraph, etc., and have the intelligence layer determine the most relevant word to the topic conveyed in that sentence/paragraph. Upon the utterance of that most relevant word, the triggering and synchronization module 122 displays the relevant link.

In an embodiment, the determining and synchronizing the appearance of a relevant link can be performed fast enough to be broadcast along side a live broadcast and depends on processor power, the complexity of the information stream, and the complexity of the batch processing job. Some lag will exist between the filter box receiving the information stream from a live broadcast and the time when the software engine has determined a relevant link to the content and then the exact frame location to insert that link. The lag can be less than 2 seconds in a simple scenario such as triggering some specified event on the utterance of a particular word. In an more complex scenario the lag may be up to 30 seconds or more to perform quite detailed analysis of what the speaker is talking about and make sure that enough live speech is captured before requesting relevant links to the content of the live broadcast.

In an embodiment, the triggering and synchronization module 122 may trigger on an event. The event may be virtually anything that can be correlated to an attribute. For example, the triggering and synchronization module 122 may display a name title on screen when a particular person's voice is detected and remove the name title when the voice stops.

Figure 4:
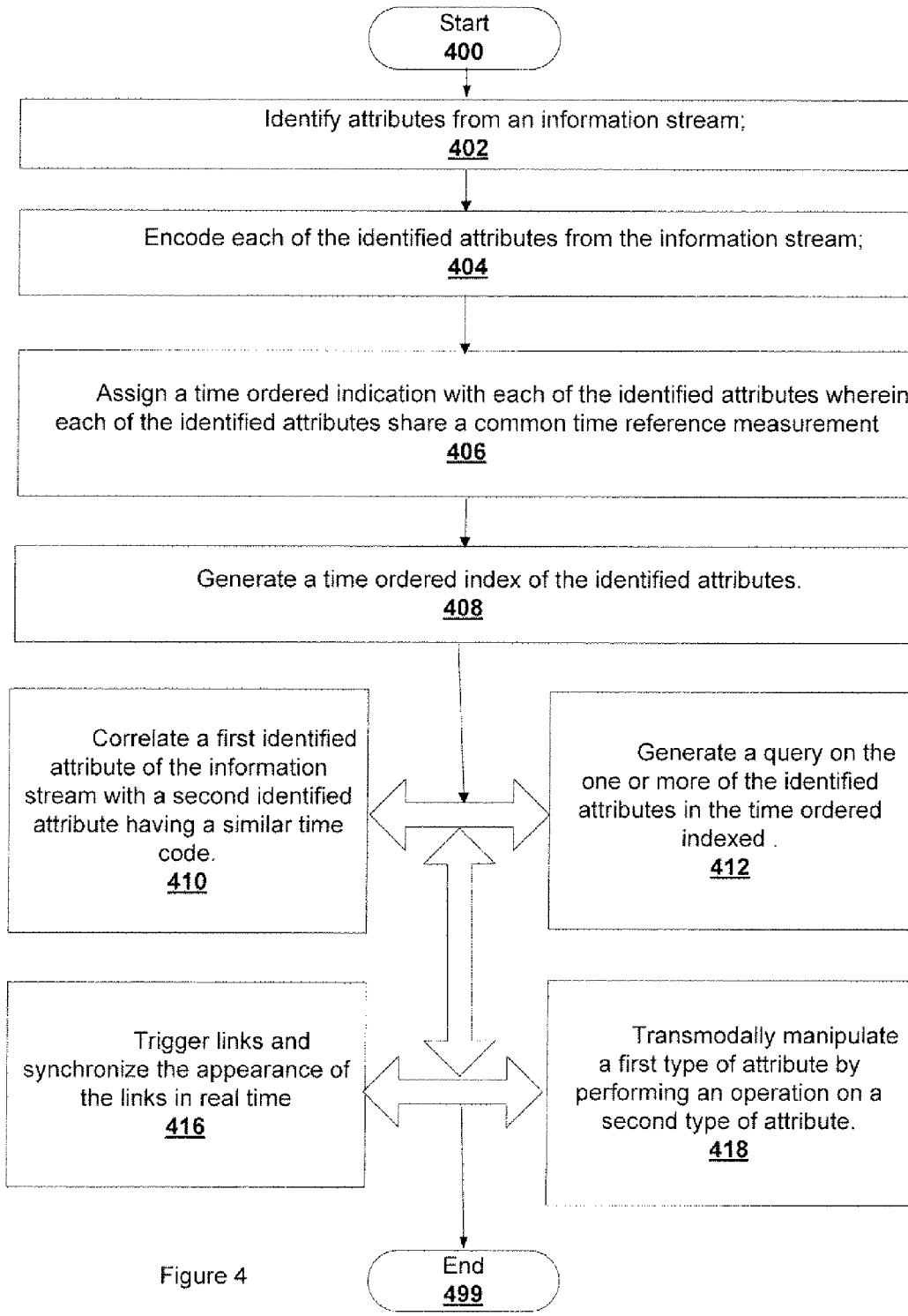
FIG. 4 illustrates a flow diagram of an embodiment of the software engine processing an information stream.

FIG. 4 illustrates a flow diagram of an embodiment of the software engine processing an information stream. In an embodiment, the software engine performs the functions as described above.

In block 402, attribute filters detect and identify attributes from an information stream. In an embodiment, the information stream is an MPEG file.

In block 404, attribute filters encode each of the identified attributes from the information stream. In an embodiment, each attribute filter encodes the identified attributes.

In block 406, attribute filters assign a time ordered indication with each of the identified attributes. The encoded document includes the type of identified attribute, the content of the identified attribute, the characteristics of the identified attribute including a time reference indicating the start time of the attribute and the time frame in which the identified attribute was conveyed. In an embodiment, the index control module supplies the time ordered indication to each attribute filter to establish a common time reference such as a video frame count or time clock indication.

In block 408, the index control module generates a time ordered index of the identified attributes.

In block 410, the intelligence engine uses the time ordered index to correlate a first identified attribute of the information stream with a second identified attribute having a similar time code.

In block 412, the manipulation-module 124 generates a query on the one or more of the time ordered indexed identified attributes based upon some query input supplied by the user.

In block 414, the trigger and synchronization module links and synchronize the appearance of the links in real time.

In block 416, the manipulation-module 124 facilitates transmodal manipulations a first type of attribute by performing an operation on a second type of attribute.

In an embodiment, the software engine may be employed in Interactive TV. The software engine derives an understanding of the actual audio, visual, and textual content being broadcast on the Interactive TV The software engine then cross references relevant link to the subject matter being broadcast in real time.

In one embodiment, the software used to facilitate the software engine can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. Slower mediums could be cached to faster, more practical, medium.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or calculating or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation and vice versa. Thus, an integrated chip may be configured to accomplish the same functions as the system engine. In an embodiment, the information stream may be a web broadcast, a satellite broadcast, a television signal, or a similar information signal. In an embodiment, multiple video information streams as wells as multiple audio information streams may be supplied to each attribute filter. In an embodiment, each attributer filter may be replicated. For example, the software engine may have two speech recognition and analysis modules in which each speech recognition and analysis module monitors a separate audio channel information stream. The invention is to be understood as not limited by the specific embodiments described herein, but only by scope of the appended claims.

What is claimed is:

1. A method, comprising:
   converting, by a computer, spoken words in an information stream to written text, the information stream containing at least audio information; and
   generating, by the computer, a separate encoded file for every spoken word, wherein each encoded file shares a common time reference.

2. The method of claim 1, wherein the information stream contains audio-visual information and the each encoded file shares a common time reference to a video frame.

3. The method of claim 2, further comprising:
   detecting shot change information;
   creating thumbnail images for each shot change;
   generating an encoded file for every shot change, each encoded file for the respective shot change containing a time ordered indication referencing to one or more corresponding spoken words.

4. The method of claim 2, further comprising:
   generating a link to the video frame based upon a user selecting one or more of the spoken words.

5. The method of claim 2, further comprising:
   generating a link to respective material based upon the spoken words and synchronizing a display of the link in less than five seconds from analyzing the information stream.

6. A non-transitory machine-readable medium storing instructions, which when executed by a machine, cause the machine to
   convert spoken words in an information stream to written text, the information stream containing audio-visual information; and
   generate a separate encoded file for every spoken word, each encoded file containing a time ordered indication reference to a respective video frame.

7. The machine-readable medium of claim 6, storing further instructions which when executed cause the machine to:
   detect shot change information;
   create thumbnail images for each shot change; and
   generate an encoded file for every shot change, each encoded file for the respective shot change containing a time ordered indication referencing to one or more corresponding spoken words.

8. The machine-readable medium of claim 6, storing further instructions which when executed cause the machine to:
   generate a link to respective material based upon the spoken words and synchronizing a display of the link in less than five seconds from analyzing the information stream.

9. The machine-readable medium of claim 6, storing further instructions which when executed cause the machine to:
   individually synchronize each word in a transcript from the information stream to be frame accurate to corresponding video data based upon both sharing a common time reference.

10. An apparatus, comprising:
    a non-transitory computer readable medium storing instructions; and
    at least one processor, the instructions executable on the at least one processor to:
      convert spoken words in an information stream to written text, the information stream containing at least audio information; and
      generate a separate encoded file for every spoken word, wherein each encoded file shares a common time reference.

11. The apparatus of claim 10, wherein the information stream contains audio-visual information and the each encoded file shares a common time reference to a video frame.

12. The apparatus of claim 10, wherein the instructions are executable on the at least one processor to:
    detect shot change information;
    create thumbnail images for each shot change;
    generate an encoded file for every shot change, each encoded file for the respective shot change containing a time ordered indication referencing to one or more corresponding spoken words.

13. The apparatus of claim 11, wherein the instructions are executable on the at least one processor to:
    generate a link to the video frame based upon a user selecting one or more of the spoken words.

* * * * *